(12) United States Patent
Freesmeier

(10) Patent No.: US 6,554,315 B2
(45) Date of Patent: Apr. 29, 2003

(54) INFLATABLE VEHICLE OCCUPANT PROTECTION DEVICE

(75) Inventor: Jon J. Freesmeier, Higley, AZ (US)

(73) Assignee: TRW Inc., Lyndhurst, OH (US)

( * ) Notice: Subject to any disclaimer, the term of this patent is extended or adjusted under 35 U.S.C. 154(b) by 18 days.

(21) Appl. No.: 09/965,277

(22) Filed: Sep. 27, 2001

(65) Prior Publication Data

US 2003/0057684 A1 Mar. 27, 2003

(51) Int. Cl.⁷ .......................... B60R 21/26; B60R 21/16
(52) U.S. Cl. ..................... 280/730.2; 280/737; 280/741
(58) Field of Search ............................ 280/730.2, 736, 280/737, 741, 728.1; 222/3

(56) References Cited

U.S. PATENT DOCUMENTS

| 4,981,534 A | | 1/1991 | Scheffe | |
|---|---|---|---|---|
| 5,172,598 A | | 12/1992 | Wilson et al. | |
| 5,433,476 A | * | 7/1995 | Materna et al. | 280/736 |
| 5,527,066 A | | 6/1996 | Svensson | |
| 5,551,723 A | * | 9/1996 | Mahon et al. | 280/737 |
| 5,564,740 A | | 10/1996 | Zakula | |
| 5,826,904 A | | 10/1998 | Ellis et al. | |
| 6,145,876 A | * | 11/2000 | Hamilton | 280/736 |
| 6,161,481 A | | 12/2000 | Shirk et al. | |
| 6,177,365 B1 | | 1/2001 | Li | |
| 6,177,366 B1 | | 1/2001 | Li | |
| 6,220,309 B1 | | 4/2001 | Sollars, Jr. | |
| 6,237,940 B1 | | 5/2001 | Shirk et al. | |
| 6,244,623 B1 | | 6/2001 | Moore et al. | |
| 6,247,725 B1 | * | 6/2001 | Moller | 280/737 |
| 6,412,811 B1 | * | 7/2002 | Campbell et al. | 280/730.2 |
| 6,431,595 B1 | * | 8/2002 | Swann et al. | 280/736 |

OTHER PUBLICATIONS

U.S. patent appln. Publ. No. 2001/0005660 A1 entitled "Low Permeability Slide Curtain Airbag Cushions having Extremely Low Coating Levels".
Research Disclosure, Dec., 1999 entitled "Air Bag Fabric for use with Cold Gas Inflator".

* cited by examiner

Primary Examiner—Paul N. Dickson
Assistant Examiner—Ruth Ilan
(74) Attorney, Agent, or Firm—Tarolli, Sundheim, Covell & Tummino L.L.P.

(57) ABSTRACT

An apparatus (10) helps to protect an occupant of a vehicle (12). The apparatus (10) includes an inflatable vehicle occupant protection device (14) that is inflatable into a position between a vehicle part (16) and a vehicle occupant. The apparatus (10) also includes an inflation fluid source (24) that provides inflation fluid for inflating the inflatable vehicle occupant protection device (14). The inflation fluid source (24) contains a stored inflation fluid (118) consisting essentially of 65–95% helium gas and 5–35% nitrogen gas stored under pressure.

9 Claims, 3 Drawing Sheets

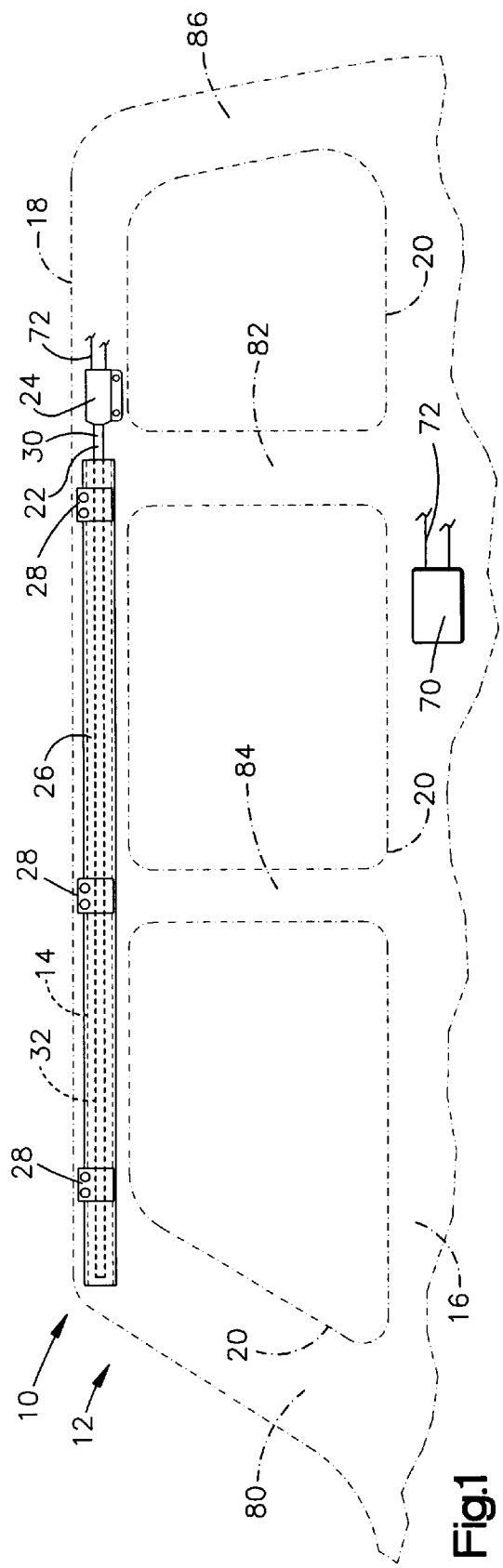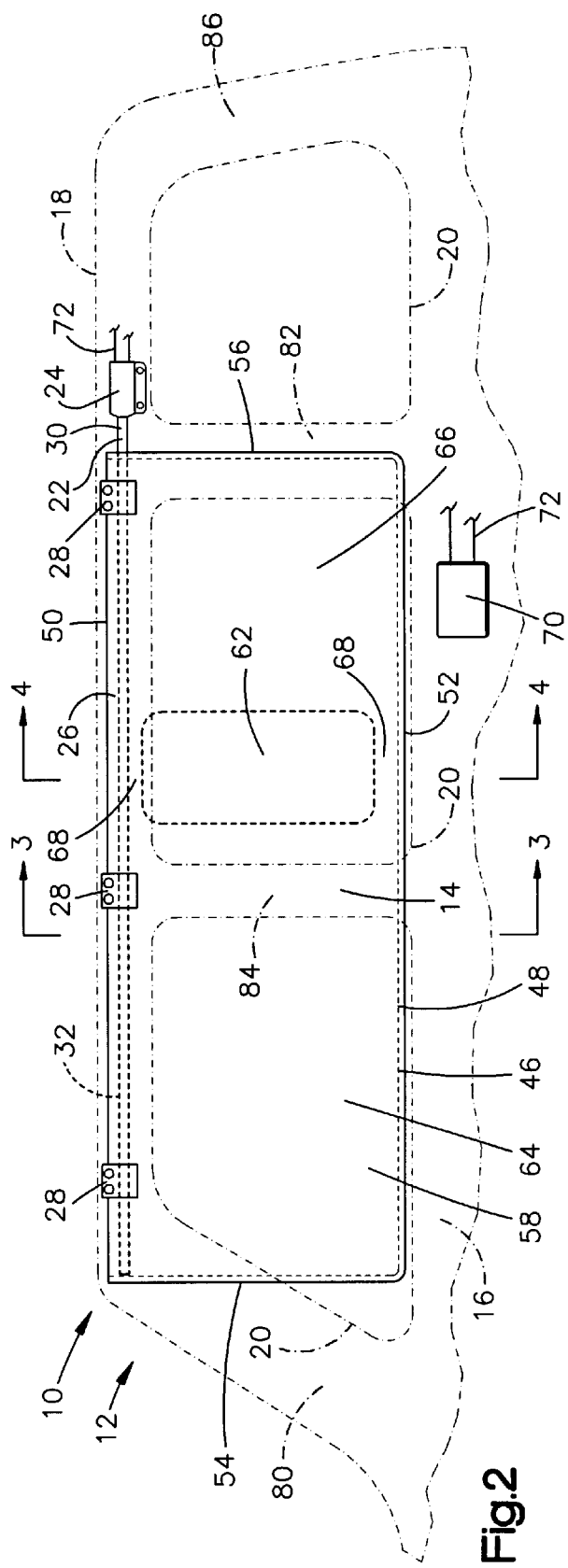

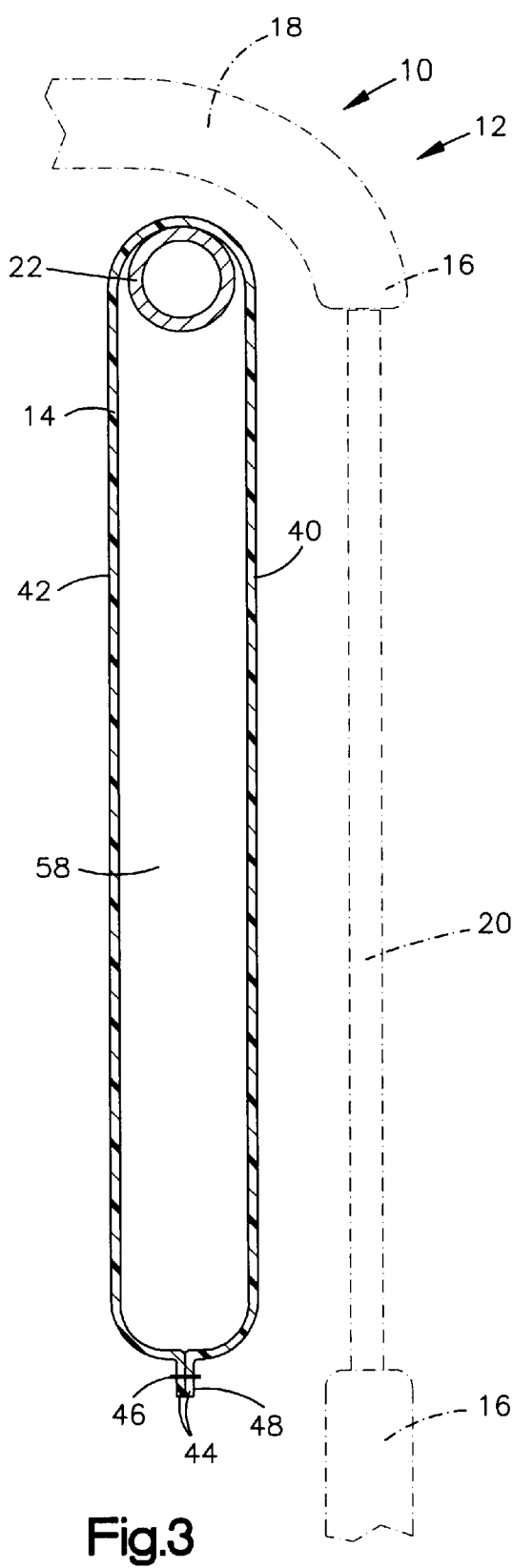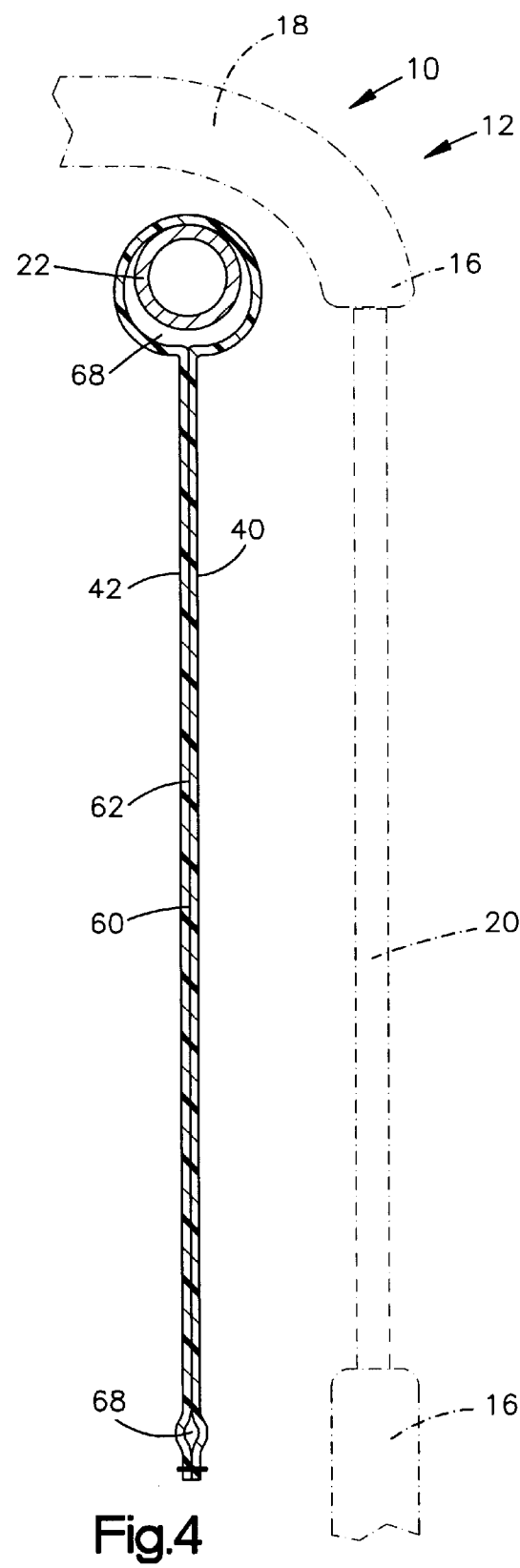

US 6,554,315 B2

INFLATABLE VEHICLE OCCUPANT PROTECTION DEVICE

FIELD OF THE INVENTION

The present invention relates to an inflatable apparatus for helping to protect a vehicle occupant in the event of a vehicle collision.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from adjacent the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle. The apparatus includes an inflatable vehicle occupant protection device that is inflatable into a position between a vehicle part and a vehicle occupant. The apparatus also includes an inflation fluid source that provides inflation fluid for inflating the inflatable vehicle occupant protection device. The inflation fluid source contains a stored inflation fluid consisting essentially of 65–95% helium gas and 5–35% nitrogen gas stored under pressure.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus for helping to protect an occupant of a vehicle according to a preferred embodiment the present invention illustrating the apparatus in a deflated condition;

FIG. 2 is a schematic view of the apparatus of FIG. 1 in an inflated condition;

FIG. 3 is a sectional view of the apparatus taken generally along line 3—3 in FIG. 2;

FIG. 4 is a sectional view of the apparatus taken generally along line 4—4 in FIG. 2.

DESCRIPTION OF PREFERRED EMBODIMENTS

Figure 5:
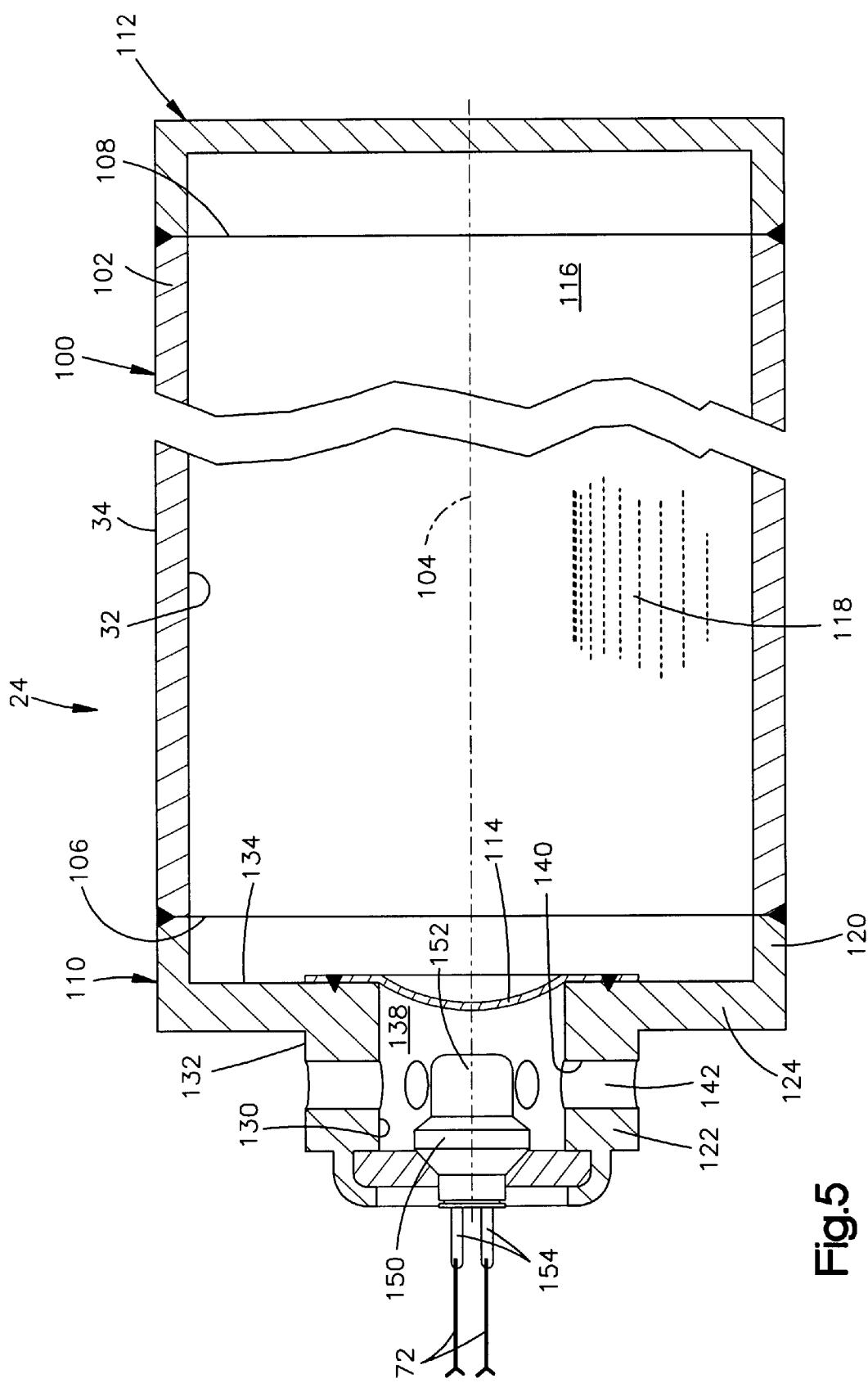
FIG. 5 is a schematic view, partially in section, of a portion of the apparatus.

As representative of the present invention, an inflatable apparatus 10 helps to protect an occupant of a vehicle 12. The present invention is applicable to any inflatable apparatus that is inflatable between a vehicle occupant and a vehicle part in the event of a vehicle collision. As shown in FIGS. 1 and 2, a preferred embodiment of the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22. The inflator 24 contains a stored quantity of pressurized inflation fluid (not shown) for inflating the inflatable curtain 14.

The fill tube 22 has a first portion 30 for receiving inflation fluid from the inflator 24. The fill tube 22 has a second portion 32 disposed in the inflatable curtain 14. The second portion 32 of the fill tube 22 has a plurality of openings (not shown) that provide fluid communication between the fill tube 22 and the inflatable curtain 14. The fill tube 22 helps to distribute the inflation fluid evenly along the length of the inflatable curtain 14 in order to help inflate and deploy the curtain evenly along its length. Those skilled in the art will appreciate that the fill tube 22 could be omitted, in which case the inflator 24 would be connected directly to the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20. The roof 18 may be either a standard roof that is fixed in place or a convertible roof that can be moved or removed. The apparatus 10 includes means 28, such as clamps or brackets, that connect the fill tube 22 and the inflatable curtain 14 to the vehicle side structure 16. The means 28 may also help connect the inflatable curtain 14 to the fill tube 22.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along at least a portion of the perimeter 48 of the panels. The overlapping portions 44 could alternatively be secured together by means such as dielectric sealing, ultrasonic bonding, heat sealing, adhesives, or by weaving the panels 40 and 42 together.

The perimeter 48 is defined at least partially by an upper edge 50 (FIG. 2) of the inflatable curtain 14, an opposite lower edge 52 of the curtain, and front and rear edges 54 and 56 of the curtain spaced apart horizontally along the upper and lower edges. The perimeter 48 defines an inflatable volume 58 of the inflatable curtain 14. Although the upper and lower edges 50 and 52 and the front and rear edges 54 and 56 are shown as being generally straight, the upper and lower edges could be curved or angled. The upper and lower edges 50 and 52 thus might intersect and eliminate either or both of the front and rear edges 54 and 56.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels. The first and second panels 40 and 42 may also be woven simultaneously and interwoven along their perimeters to form the inflatable curtain 14.

The first and second panels 40 and 42 are constructed of a fabric, such as nylon, that is coated with a gas impermeable material, such as urethane or silicone. Other materials, such as elastomers, plastic films, or combinations thereof, may also be used to construct the inflatable curtain 14. The first and second panels 40 and 42 may also be formed of single or multi-layered sheets of material.

As illustrated in FIG. 4, the first and second panels 40 and 42 may be connected together by known means 60, such as stitching, dielectric sealing, ultrasonic bonding, heat sealing, adhesives, tethers, or interweaving the panels, to form a non-inflatable area 62 within the inflatable volume 58 (FIG. 2) of the inflatable curtain 14. Such a non-inflatable area 62 may be desirable in areas along the side structure 16 of the vehicle 12 where occupants are unlikely to come into contact with the side structure. This may help to reduce the amount of inflation fluid required to fill the inflatable curtain 14 and reduce the time required to inflate the curtain. Such a non-inflatable area 62 may also be desirable to help control the thickness of the inflatable curtain 14 and to define inflatable chambers of the curtain.

As illustrated in FIG. 2, the non-inflatable area 62 is generally rectangular. It will be recognized by those skilled in the art, however, that it may be desirable for the non-inflatable area 62 to have a different configuration, depending upon the particular design of the inflatable curtain 14, the shape of the vehicle 12 in which the apparatus 10 is being installed, and the desired shape of the inflatable portion(s) of the curtain. For example, the non-inflatable area 62 could consist of linear connections in which the panels are interconnected along straight or curved lines, areas of connection in which the panels are interconnected in areas defined by straight or curved boundaries, or a combination of linear connections and area connections.

In the illustrated embodiment, the non-inflatable area 62 helps to define inflatable forward and rearward portions 64 and 66, respectively, of the inflatable volume 58 of the inflatable curtain 14. In the illustrated embodiment, the forward and rearward portions 64 and 66 are connected in fluid communication with each other by passages 68 that extend along the upper and lower edges 50 and 52 of the inflatable curtain 14 between the respective upper and lower edges and the non-inflatable area 62. The forward and rearward portions 64 and 66, however, may not be connected in fluid communication with each other. When the inflatable curtain 14 is inflated, the forward portion 64 is positioned forwardly in the vehicle 12, between the side structure 16 of the vehicle and any occupant seated forwardly in the vehicle. The inflated rearward portion 66 is positioned rearwardly in the vehicle 12, between the side structure 16 of the vehicle and any occupant seated rearwardly in the vehicle.

The inflator 24 may have any construction suitable for storing pressurized inflation fluid for inflating the inflatable curtain 14. An example of one such suitable construction is illustrated in FIG. 5. Referring to FIG. 5, the inflator 24 includes a container 100 made of a suitable material, such as steel or aluminum. The container 100 includes a generally cylindrical side wall 102 defining a tubular container portion extending along a longitudinal central axis 104 between first and second open ends 106 and 108, respectively, of the tubular container portion.

The container 100 further includes an end cap 110 secured to the first end 106 by any suitable means, such as a weld. The container 100 also includes an end plug 112 secured to the second end 108 by any suitable means, such as a weld. The end cap 110 includes a burst disk 114. The side wall 102, the end cap 110, the burst disk 114 and the end plug 112 cooperate to define a closed chamber 116 in the container 100. A supply of inflation fluid 118 for inflating the inflatable curtain 14 is stored in the chamber 116.

The end cap 110 includes a first cylindrical wall 120 having a first diameter and a second cylindrical wall 122 having a second, smaller diameter. The cylindrical walls 120 and 122 are coaxial with the side wall 102. The first cylindrical wall 120 has the same inner and outer diameter as the side wall 102. An annular end wall 124 extends perpendicular to axis 104 between and connecting the first and second cylindrical walls 120 and 122.

The second cylindrical wall 122 has a cylindrical inner surface 130 and a cylindrical outer surface 132 parallel to the inner surface. The inner surface 130 of the second cylindrical wall 122 defines a central passage 138 in the end cap 110 of the container 100. The burst disk 114 is secured to an annular surface 134 surrounding the central passage 138 by any suitable means, such as a weld, to block the central passage.

A plurality of cylindrical surfaces 140 extend radially between the inner surface 130 and the outer surface 132 of the second cylindrical wall 122 of the end cap 110 to define a plurality of inflation fluid passages 142. The passages 142 provide fluid communication between the central passage 138 and the fill tube 22. The central passage 138, when not blocked by the burst disk 114, provides fluid communication between the passages 142 and the chamber 116.

The second cylindrical wall 122 supports an initiator 150 including initiation means 152, such as a squib, for rupturing the burst disk 114. The initiator 150 also includes terminal posts 154 operatively connected to lead wires 72 which provide a signal for actuating the initiator.

The vehicle 12 includes a sensor mechanism 70 (shown schematically in FIGS. 1 and 2) for sensing a side impact to the vehicle 12 and/or a rollover of the vehicle 12. The sensor mechanism 70 actuates the inflator 24 in response to the sensing of a side impact or a vehicle rollover by sending a signal via the lead wires 72 to the inflator.

In the event of a rollover of the vehicle 12 or a side impact to the vehicle for which inflation of the inflatable curtain 14 is desired, the sensor mechanism 70 provides an electrical signal over the lead wires 72 to the initiator 150 (FIG. 5). Upon receiving the signal via the lead wires 72, the means 152 is actuated, which causes the burst disk 114 to rupture in a known manner. Rupture of the burst disk 114 enables the stored gas 118 to flow out of the chamber 116 through the central passage 138 and the passages 142 into the fill tube 22. The fill tube 22 directs the inflation fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 of the inflatable curtain 14 is positioned adjacent the intersection of the roof 18 and the side structure 16 of the vehicle 12. The front edge 54 of the inflatable curtain 14 is positioned adjacent an A pillar 80 of the vehicle 12. The rear edge 56 of the inflatable curtain 14 is positioned adjacent a C pillar 82 of the vehicle 12. The inflatable curtain 14 extends between the A pillar 80 and the C pillar 82 of the vehicle 12 and overlies at least a portion of the A pillar, C pillar, and a B pillar 84 of the vehicle.

It will be recognized by those skilled in the art that the inflatable curtain may have alternative configurations. For example, in the illustrated embodiment, the inflatable curtain 14 extends between the A pillar 80 and the C pillar 82 of the vehicle 12. The inflatable curtain 14 could, however, extend between the A pillar 80 and the B pillar 84 only or between the B pillar and the C pillar 82 only. Also, the inflatable curtain 14 could, when inflated, extend between the A pillar 80 and a D pillar 86 of the vehicle 12.

The inflatable curtain 14, when inflated, helps to protect a vehicle occupant in the event of a vehicle rollover or a side impact to the vehicle 12. The non-inflatable portion 62 helps to limit the thickness of the inflated inflatable curtain 14 and helps to reduce the overall volume of the curtain. The forward and rearward portions 64 and 66, when inflated, help to absorb the energy of impacts with the inflatable curtain 14 and help to distribute the impact energy over a large area of the curtain. The passages 68 also help to distribute the impact energy over a large area of the inflatable curtain 14 by allowing inflation fluid to move between the forward and rearward portions 64 and 66 upon impacts with the curtain.

Once the inflatable curtain 14 is inflated, it is desirable for the inflation fluid in the curtain to be maintained at a desired pressure in order to help prevent vehicle occupants from penetrating through the curtain. By "penetrating through," it is meant that the pressure of the inflation fluid in the inflatable curtain is insufficient to prevent an occupant from moving the first and second panels together upon striking the curtain, in which case the occupant essentially strikes the side structure 16 of the vehicle 12. Preferably, once the inflatable curtain 14 is inflated, the inflation pressure should remain at or above a desired pressure, preferably 160 kilopascals (kPa) absolute, for a predetermined period of time, preferably at least about the first 5–7 seconds of inflation. The desired pressure could, however, be higher or lower depending upon factors such as the volume of the inflatable curtain 14 and the thickness of the curtain when inflated.

In order to achieve the desired pressure in the inflatable curtain 14 when the curtain is initially inflated, the inflator 24 must deliver a given amount of inflation fluid to the curtain. This amount depends on the volume of the inflatable curtain 14. According to the present invention, the inflator 24 is a stored gas inflator containing compressed inflation fluid at about 3500–7500 psig, preferably at about 6250 psig. In order to achieve the desired pressure in an inflatable curtain having a volume in the range of 12–50 liters, the preferred inflator must deliver about 0.7–3.3 moles of inflation fluid. As an example, an inflatable curtain having a volume of about 27 liters may require about 2.2 moles of inflation fluid in order to achieve a desired inflation pressure.

Those skilled in the art will recognize that the apparatus 10 may experience leakage of inflation fluid prior to actuation of the inflator 24, during inflation of the inflatable curtain 14, or after the curtain is inflated. Prior to actuation of the inflator 24, inflation fluid may leak extremely slowly from the inflator over a long period of time, e.g., over a period of years. This is because a perfect seal at such high pressures is difficult to achieve. During inflation of the inflatable curtain 14, leakage may be experienced at leakage points, such as hardware connections (e.g., at the locations where the curtain is clamped to the fill tube 22), or through the curtain itself. This is also the case after the inflatable curtain 14 is inflated.

Therefore, it will be appreciated that the amount of inflation fluid delivered to the inflatable curtain 14 must account for losses due to leakage, curtain stretching/ expansion, and other reasons. This is especially true when using an inflation fluid comprising a gas having a low atomic weight, such as helium, because such gasses flow more easily through the leakage points than gasses having higher atomic weights. Therefore, leakage and other losses are taken into account when sizing the inflator 24, i.e., extra inflation fluid may be included in order to account for potential inflation fluid losses. Also, additional sealing means may be applied to the inflatable curtain 14 and any connections between the curtain and the inflator 24 and/or fill tube 22 where leakage may occur. Those skilled in the art, however, will appreciate that it may be desirable to avoid the need for such additional sealing means.

According to the present invention, the inflator 24 is a stored gas inflator containing inflation fluid in the form of a mixture of helium gas and nitrogen gas stored under pressure. No other forms of inflation fluid are stored in the inflator 24, and the inflator does not include any other types of material, such as pyrotechnic material, for generating inflation fluid. The inflation fluid consists essentially of 65–95% helium gas and 5–35% nitrogen gas, by volume. Preferably, the inflation fluid consists essentially of 85–95% helium gas and 5–15% nitrogen gas. More specifically, the inflation fluid preferably consists essentially of about 90% helium gas and about 10% nitrogen gas.

The nitrogen gas included in the inflation fluid helps to compensate for effects caused by the low atomic weight of helium. Nitrogen gas has about 7 times the mass of helium. Therefore, the inflation fluid, consisting essentially of a mixture of helium and nitrogen, will flow more slowly through leakage points or the inflatable curtain 14 than an inflation fluid consisting essentially of helium alone. The helium/nitrogen inflation fluid mixture also will have a lesser tendency to leak from the inflator 24 prior to actuation of the inflator. The helium/nitrogen inflation fluid mixture of the present invention thus helps eliminate the need for additional sealing means that might otherwise be required if using helium alone as an inflation fluid.

Those skilled in the art will recognize that the helium/ nitrogen inflation fluid mixture will also flow more slowly from the inflator 24 through the fill tube 22 and into the inflatable curtain 14. The structure of the apparatus 10 can, however, be adapted to compensate for the slower fluid flow by sizing the fill tube 22 and/or the openings in the fill tube to deliver the desired amount of inflation fluid to the inflatable curtain 14 in the desired amount of time.

When the inflator 24 is actuated, there is a large pressure differential between the compressed inflation fluid in the inflator and the gas occupying the fill tube 22. The size of the inflator 24 and/or the fill tube 22 is selected such that the inflation fluid accelerates from the inflator 24 into the fill tube 22 and achieves sonic flow, i.e., reaches a supersonic velocity. Once inside the fill tube 22, the inflation fluid slows to a velocity below supersonic speed as pressure builds in the fill tube. As pressure rises in the fill tube 22, a large pressure differential is created between the tube and the inflatable curtain 14. This causes the inflation fluid to reach a supersonic velocity as the fluid enters the inflatable curtain 14 through the outlet apertures.

By "supersonic velocity", it is meant that the velocity is above that of the speed of sound in a given medium. For example, based on known principles of gasses, the speed of sound of the helium/nitrogen inflation fluid mixture will be a given velocity at a given temperature. Thus, a supersonic velocity of the helium/nitrogen inflation fluid mixture at the given temperature would be above the given velocity for that temperature.

When the inflation fluid reaches a supersonic velocity as it enters the fill tube 22 from the inflator 24, a shock wave is created, which propagates back and forth along the length of the tube. As the shock wave propagates along the fill tube 22, fluid temperatures at the end of the tube opposite the inflator 24 can reach maximum temperatures in the range of 1000–1750 degrees Kelvin. These high fluid temperatures are a result of adiabatic compressive heating of air that is in the fill tube 22 prior to actuation of the inflator 24 and isentropic heating of the inflation fluid and air mixture as the shock wave passes through the fluid media in the tube. Also, as the inflation fluid passes through the fill tube 22, the fluid gains heat thermodynamically from the tube, which results in higher pressures in the inflatable curtain 14 for a given amount of inflation fluid.

For purposes of the present invention, ambient temperature is defined as 295° K, which is equal to about 22° C. or 71.6° F. As the inflation fluid enters the inflatable curtain 14, the fluid quickly cools to a temperature just above ambient temperature. This helps to ensure that the desired pressure of the inflation fluid in the inflatable volume 58 of the inflatable curtain 14 is maintained. Specifically, the temperature of the inflation fluid in the inflatable curtain 14, being just above ambient temperature, will be less susceptible to pressure loss due to thermodynamic heat loss. For example, if the inflation fluid in the inflatable curtain 14 were at a significantly higher temperature than the ambient temperature, the inflation fluid pressure in the curtain would decrease as the fluid is cooled.

The above-listed results are achieved by using the helium/nitrogen inflation fluid mixture of the present invention in conjunction with the apparatus 10, which is constructed to deliver the required amount of inflation fluid to the inflatable curtain 14 in the required amount of time. In the illustrated embodiment, the fill tube 22 is constructed to deliver the required amount of inflation fluid to the inflatable curtain 14 in the required amount of time. The use of the pressurized inflation fluid having the helium/nitrogen composition disclosed herein is thus critical to the present invention. In the illustrated embodiment, the inflatable curtain 14 has a volume of about 27 liters. About 2.2 moles of the helium/nitrogen inflation fluid mixture are required to inflate the inflatable curtain 14 to the required pressure (at or above 160 kPa absolute) in the required time (20–30 ms).

Knowing these requirements, the inflator 24 and fill tube 22 are sized so as to provide the helium/nitrogen inflation fluid mixture to the inflatable curtain 14 at a molar flow rate sufficient to inflate the curtain to the desired pressure in the required time. In the illustrated embodiment, the inflator 24 stores the helium/nitrogen inflation fluid mixture at about 6250 psig and the fill tube 22 is sized to deliver the inflation fluid at a molar flow rate sufficient to fill the inflatable curtain 14 to the required pressure in the required amount of time. In sizing the fill tube 22, the cross-sectional flow area of the tube, the number of openings in the tube, and the size/spacing of the openings are selected to provide the amount of inflation fluid required to inflate the inflatable curtain 14 to the desired pressure in the required time.

The cross-sectional flow area of the fill tube 22 is also sized so as to cause the helium/nitrogen inflation fluid mixture entering the inflatable curtain 14 to maintain supersonic velocity during deployment of the curtain. As stated above, the helium/nitrogen inflation fluid mixture gains heat through compressive heating of the air in the fill tube 22, shock wave propagation/oscillation along the length of the fill tube, and thermodynamic heat transfer from the tube. As the helium/nitrogen inflation fluid mixture enters the inflatable curtain 14, the fluid quickly cools to a temperature just above ambient temperature which, as stated above, helps to prevent pressure loss in the curtain.

The results realized in the illustrated embodiment are facilitated through the use of the helium/nitrogen inflation fluid mixture in combination with the fill tube 22 construction appropriately selected to deliver the required amount of inflation fluid to the inflatable curtain 14 in the required amount of time. Inflation fluids mixtures of helium and nitrogen that fall outside the disclosed proportions disclosed herein will not produce the required results.

For example, inflation fluids having a helium/nitrogen inflation fluid mixture in which the helium is provided in a proportion less than that of the inflation fluid of the present invention will not produce the inflation time, pressure, and temperature described above because an overabundance of nitrogen gas would help prevent the inflation fluid from achieving sonic flow. Also, for example, inflation fluids having a helium/nitrogen inflation fluid mixture in which the nitrogen is provided in a proportion less than that of the inflation fluid of the present invention will not produce the reduced leakage described herein.

Helium, having a low molecular weight, has a relatively high sonic flow rate compared to other gasses. Thus, at a given temperature, helium will flow through the fill tube and into the inflatable curtain 14 faster than a gas having a higher molecular weight. The helium/nitrogen inflation fluid mixture of the present invention, including helium in a large proportion, thus realizes these advantages.

Gasses other than helium have low sonic flow rates compared to helium. Such gasses, if used alone in a stored gas inflator, would not produce the required flow into the inflatable curtain 14 to inflate the device to the required pressure in the required time without some form of augmentation, such as added heat. Such gasses, if used in a stored gas inflator without augmentation, would thus be incapable of achieving the desired results of inflating the inflatable curtain 14 to the desired pressure in the required time.

The nitrogen included in the helium/nitrogen inflation fluid mixture lowers the sonic flow rate of the inflation fluid. Nonetheless, the helium/nitrogen inflation fluid mixture in the proportions disclosed in the present invention will not lower the sonic flow rate to a level where the required molar flow rate of the inflation fluid cannot be achieved using the apparatus 10 of the disclosed construction. The helium/nitrogen inflation fluid mixture of the present invention will permit the inflator 24 and/or fill tube 22 to have a construction appropriately selected to deliver the required molar flow rate of inflation fluid to the inflatable curtain 14 so that the curtain is inflated in the required amount of time.

Also, the critical temperature and critical pressure of helium (−267° C. and 33.8 psia, respectively) and the critical temperature and critical pressure of nitrogen (−147° C. and 492 psia, respectively) are low as compared to other gasses. This helps to ensure that the inflation fluid will remain in a gaseous state throughout inflation. Other gasses having higher critical temperatures and pressures may require augmentation, such as added heat, in order to ensure that the inflation fluid will remain in a gaseous state throughout inflation.

The physical properties of helium are such that helium gains and loses heat quickly in comparison to other gases. Thus, as the helium/nitrogen inflation fluid mixture passes through the fill tube 22, it gains heat quickly. The helium/nitrogen inflation fluid mixture also loses heat quickly when it enters the inflatable curtain 14 and quickly cools to a temperature just above ambient temperature. Thus, the inflatable curtain 14 will experience a smaller amount of pressure loss over time due to cooling of the helium/nitrogen inflation fluid mixture. Although nitrogen will not gain or lose heat as quickly as helium, the relatively low proportion of nitrogen in the helium/nitrogen inflation fluid mixture will not detract substantially from the results provided by the helium in the mixture.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle, said apparatus comprising:

an inflatable vehicle occupant protection device that is inflatable into a position between a vehicle part and a vehicle occupant; and an inflation fluid source that provides inflation fluid for inflating said inflatable vehicle occupant protection device, said inflation fluid source containing a stored inflation fluid consisting essentially of 65–95% helium gas, by volume and 5–35% nitrogen gas by volume stored under pressure.

2. The apparatus as recited in claim 1, wherein said inflation fluid source has a stored inflation gas consisting essentially of perferably 80–95% helium gas, by volume and 5–15% nitrogen gas, by volume stored under pressure.

3. The apparatus as recited in claim 1, wherein said inflation fluid source has a stored inflation gas consisting essentially of perferably about 90% helium gas, by volume and about 10% nitrogen gas, by volume stored under pressure.

4. Apparatus as recited in claim 1, wherein said inflatable vehicle occupant protection device comprises an inflatable curtain inflatable away from a roof of the vehicle roof into a position between a side structure of the vehicle and a vehicle occupant.

5. The apparatus as recited in claim 4, further comprising a fill tube for delivering said inflation fluid from said inflation fluid source to said inflatable curtain, said fill tube having a portion disposed in said inflatable curtain.

6. The apparatus as recited in claim 4, wherein said inflation fluid source inflates said inflatable vehicle occupant protection device to a predetermined pressure and maintains said inflatable vehicle occupant protection device at or above said predetermined pressure for at least 5–7 seconds.

7. The apparatus as recited in claim 6, wherein said predetermined pressure is about 160 kilopascals absolute.

8. The apparatus as recited in claim 1, wherein said inflation fluid is stored in said inflation fluid source at a desired pressure of 3500–7500 psig.

9. The apparatus as recited in claim 8, wherein said desired pressure is about 6250 psig.

* * * * *